Sept. 20, 1932.   F. L. MORSE   1,878,882
DRIVE CHAIN
Filed March 21, 1929
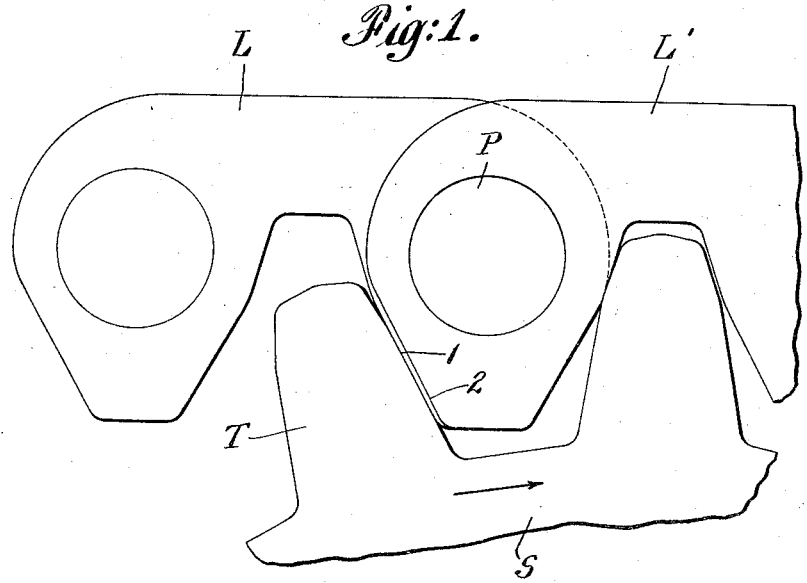
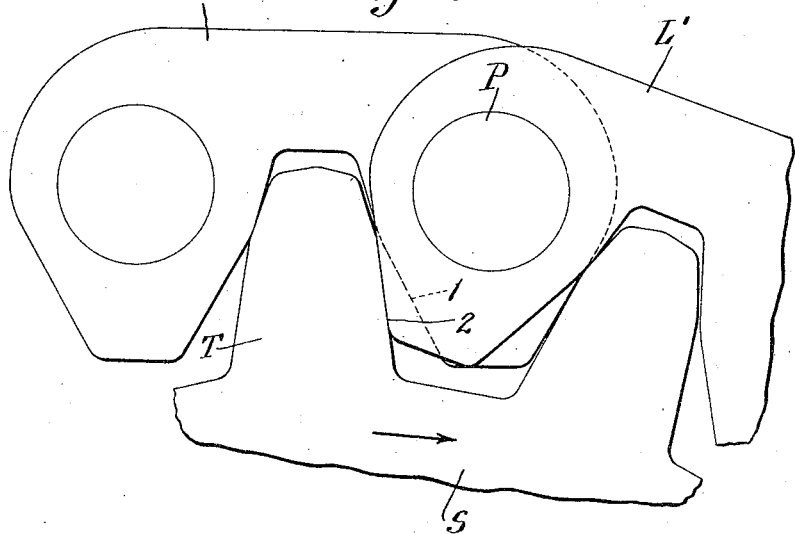
INVENTOR
Franck L. Morse
BY
Lyrnestvedt & Lechner
ATTORNEYS Patented Sept. 20, 1932

1,878,882

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

DRIVE CHAIN

Application filed March 21, 1929. Serial No. 348,815.

This invention relates to chains used in the transmission of power, particularly the type generally known as silent chains, which are built up of interspersed link plates having inwardly projecting teeth which mesh with the teeth of the sprocket wheels. The invention is applicable to various forms of chains, and is not concerned with any particular form of joint, but may be applied to practically any form of chain having projecting teeth on its link plates. The novelty resides in the manner in which the link plates engage the teeth of the sprocket wheel when the drive is running, particularly the manner in which the links seat home through a process of successive alternative contacts on adjacent links. This will be made clear by the following description, together with the accompanying drawing, in which—

Fig. 1 shows the first position of a two stage engagement with the sprocket tooth making initial engagement with the inside of a link.

Fig. 2 shows the second or final position of the two stage engagement, with the sprocket tooth making final engagement with the outside or tail of the adjacent preceding link.

In the drawing, a portion of a chain and sprocket are shown representing a tooth in the act or process of picking up or engaging a running chain. The sprocket and chain are running in the direction of the arrow, and the tooth T of the sprocket S is in the process of engagement. The portion of the chain shown comprises a link L and part of a preceding link L' connected by the pintle P. The invention is not limited to any particular form of pintle construction, and hence I have shown the pintle P in a conventional form, as it will be obvious to those skilled in the art that many other forms of pintle may be used.

Referring now to Fig. 1, which shows the first position in a two stage engagement, it will be seen that the sprocket tooth T has just come into initial contact with the inside face 1 of the arched link L, this being what is generally known as "inside engagement". It will be noted that the tail 2 of the next preceding link L' is slightly cut away so that at this stage it does not make contact with the teeth T. This being at the very instant of engagement, the chain is still straight and the joint has not begun to bend.

I accomplish this by making the forward teeth of the links in the direction of run of the chain, which in this instance are the right hand teeth, wider than the rearward or left hand teeth of the links, and by so locating the pintles P that when the chain is in its straight run, as illustrated in Fig. 1, the inside surfaces 1 of the links L overlap or are spaced from the tails 2 of the links L'. Stated in another way, the portion of the teeth or heads of the plates of the link L to the rear of the pintles is wider than the corresponding portion of the heads of the interspersed plates of the adjacent link L', so that the inside surfaces 1 overlap the outside surfaces 2 when the chain is straight. It is to be noted, however, that the amount of this overlap is such that the tooth T engages the tail 2 of the link L' when the chain operates and reaches its bent position in going around the sprocket wheel S, as illustrated in Fig. 2. The inside engaging surfaces 1 and the outside engaging surfaces 2 are of such contour that substantial tooth engagement is afforded in both of the positions mentioned and the transition from inside contact to outside contact is very smooth and gradual. It will thus be seen that the chain in the process of going on to and turning around the sprocket wheel goes through two stages of contact, the first being inside contact with the links L, and the second being outside contact with the links L'.

Fig. 2 represents the condition when the chain passes over the sprocket, the chain having traveled forward and the link L' having bent down in turning around the sprocket. This brings the projecting tail of the link L' into contact with the sprocket tooth T at the point 2, and forces the inside engagement surface 1 of the link L out of contact with the tooth T. The tooth T then drives the chain through an outside or end engagement with the link L'.

It will thus be seen that by properly designing the link plates and by utilizing the movements of one link relative to the next as it turns on the sprocket, the sprocket tooth can make alternative successive engagements with different links during a single engagement period, that is, between the time it first makes contact and the time when it reaches its final engagement position. The successive engaging faces may have various degrees of straightness of curvature, to ensure of their coming into engagement smoothly in the nature of a cam action. It will be obvious from the foregoing that the essential principle is to utilize the turning movement of the links to bring different link plate surfaces successively into action against the engaging tooth as the chain settles into position on the wheel.

As the chain moves from the position shown in Fig. 1 to that shown in Fig. 2 a camming action takes place along the surface 1 so that very smooth engagement of the tooth with the chain is obtained from the first position of contact to the final position in which the chain fully seats on the sprocket. This smooth action eases shocks and breaks up objectionable vibrations, thus producing a chain of smooth running qualities.

While I have described the invention in a certain specific preferred embodiment in the foregoing, it will be understood that this is merely by way of illustration to make clear the principles thereof, and that the invention is susceptible to various modifications and adaptations in different installations as will be apparent to those skilled in the art, without departing from the scope of the invention as set forth in the following claims.

I claim:

1. In combination, a sprocket wheel and a drive chain having links composed of a plurality of plates having tooth like heads, the plates of one link being interspersed with the plates of the adjacent link, and pintles connecting said links, the portion of the heads of the plates of one link to the rear of the pintles being wider than the corresponding portion of the heads of the interspersed plates of the adjacent link so that inside surfaces are presented to the sprocket teeth when the chain is straight and in the initial stages of bending and that outside surfaces are presented to the teeth when the chain is in the final stages of bending.

2. A drive chain having links composed of arch-shaped link plates, pintles connecting said links with the plates of one link interspersed with the plates of the adjacent link, and the plates of each link having internal engaging surfaces at one end which extend beyond outside engaging surfaces of the interspersed plates of the adjacent link when the chain is straight and in its initial stages of bending, and which recede from said outside engaging surfaces when the chain approaches and reaches its final bend.

3. A drive chain having links composed of arch-shaped link plates, pintles connecting said links with the plates of one link interspersed with the plates of the adjacent link, the portion of the heads of the plates of one link to the rear of the pintles being wider than the corresponding portion of the heads of the interspersed plates of the adjacent link so as to provide internal engaging surfaces at each joint extending beyond outside engaging surfaces thereat when the chain is straight and in its initial stages of bending, and external engaging surfaces extending beyond inside engaging surfaces when the chain approaches and reaches its final bend.

4. In a drive chain, the combination of link plates provided with heads having inside and outside tooth engaging surfaces and pintle holes, and pintles fitting said holes for connecting the link plates to form a chain, said surfaces being so configured and the pintle holes being so located in the heads that the inside surfaces of the link plates overlap the outside surfaces of the connected link plates when the chain is straight and that the outside surfaces of the connected link plates overlap the inside surfaces of the first-mentioned link plates when the chain is bent around a sprocket.

In testimony whereof I have hereunto signed my name.

FRANK L. MORSE.